INVENTOR
LOUIS A. RUSSELL
BY William V. Schellberg
AGENT

INVENTOR
LOUIS A. RUSSELL
BY William V. Schellberg
AGENT

March 15, 1960 L. A. RUSSELL 2,929,050

DOUBLE ENDED DRIVE FOR SELECTION LINES OF A CORE MEMORY

Filed May 27, 1955 5 Sheets-Sheet 3

INVENTOR
LOUIS A. RUSSELL

BY William V. Schelberg
AGENT

March 15, 1960 L. A. RUSSELL 2,929,050

DOUBLE ENDED DRIVE FOR SELECTION LINES OF A CORE MEMORY

Filed May 27, 1955 5 Sheets-Sheet 4

INVENTOR
LOUIS A. RUSSELL

BY William V. Schelberg
AGENT

March 15, 1960 L. A. RUSSELL 2,929,050

DOUBLE ENDED DRIVE FOR SELECTION LINES OF A CORE MEMORY

Filed May 27, 1955 5 Sheets-Sheet 5

INVENTOR
LOUIS A. RUSSELL
BY William V. Schelberg
AGENT

United States Patent Office 2,929,050

Patented Mar. 15, 1960

2,929,050

DOUBLE ENDED DRIVE FOR SELECTION LINES OF A CORE MEMORY

Louis A. Russell, Poughkeepsie, N.Y., assignor to International Business Machines Corporation, New York, N.Y., a corporation of New York Application May 27, 1955, Serial No. 511,445

9 Claims. (Cl. 340—174)

The present invention relates to magnetic matrix memories and more particularly to an arrangement for reducing attenuation of drive pulses employed for operating a large scale array of magnetic elements.

A random access static magnetic memory has been described in the article by Jay W. Forrester in the Journal of Applied Physics, January 1951, page 44, entitled "Digital Information Storage in Three Dimensions Using Magnetic Cores." In such a system information in binary form is represented by the remanence state of magnetic elements such as toroidal cores with the state of storage controlled by the application of current impulses to windings placed about the cores. Core arrays are conventionally arranged in rows and columns and, in a three dimensional system, require three or more windings for control. Cores in the same row and column have series connected row and column windings wherein current excitation produces at least half but less than the full magnetomotive force required to cause a change in the remanence state. Reading consists in selecting a particular row and column winding for simultaneous energization and, in a three dimensional system of selection, the cores located at the junction of the selected row and column planes are energized as a group to return to a datum residual state if not already in such a state. Such a group of cores is termed a word line and each core forming a bit of the word lies in a separate Z plane which is provided with an individual sense or output winding and an inhibit winding. Writing a word is accomplished by selecting the row and column or X and Y windings for energization in a sense reverse to that for reading so that each core of the word line stores a one or switches to the other remanence state unless inhibited by a current impulse applied simultaneously to the Z plane inhibit winding of a particular word bit core.

Currents for operating such a system to read and write are of opposite polarity and may be developed by a core driver system such as that described and claimed in the copending application of R. G. Counihan, filed July 2, 1954, Serial Number 440,983, and which is assigned to a common assignee. Where arrays of the type described have large capacity and in arrays such as multi-dimensional selection systems using selection ratios less than two to one, each of the series connected selection windings link many cores and the presence of series inductance, resistance and capacitance effects along the selection lines causes them to have the characteristics of a transmission line so that the attenuation properties may be of such magnitude as to prevent proper control.

As the magnitude of the selecting currents in a coincident current operated system is critical, it is essential that attenuation must be restricted or the size of the arrays limited to a capacity wherein attenuation and delay effects are negligible.

In accordance with the invention, these effects are reduced by applying read or write operating pulses simultaneously to both ends of the selection lines with the result that the net current at any distance along the line is the sum of the currents from the drivers at both ends.

It is an object of the present invention to obviate the restriction on the size of a magnetic memory array due to attenuation of drive current impulses.

A further object of the invention is to provide a novel apparatus for reducing reflections, delay and attenuation effects in magnetic memory arrays.

A more specific object of the invention is to provide a magnetic core current driver arrangement for driving both ends of a coordinate selection line of a coincident current operated core memory array.

Other objects of the invention will be pointed out in the following description and claims and illustrated in the accompanying drawings, which disclose, by way of example, the principle of the invention and the best mode, which has been contemplated of applying that principle.

Figure 1:
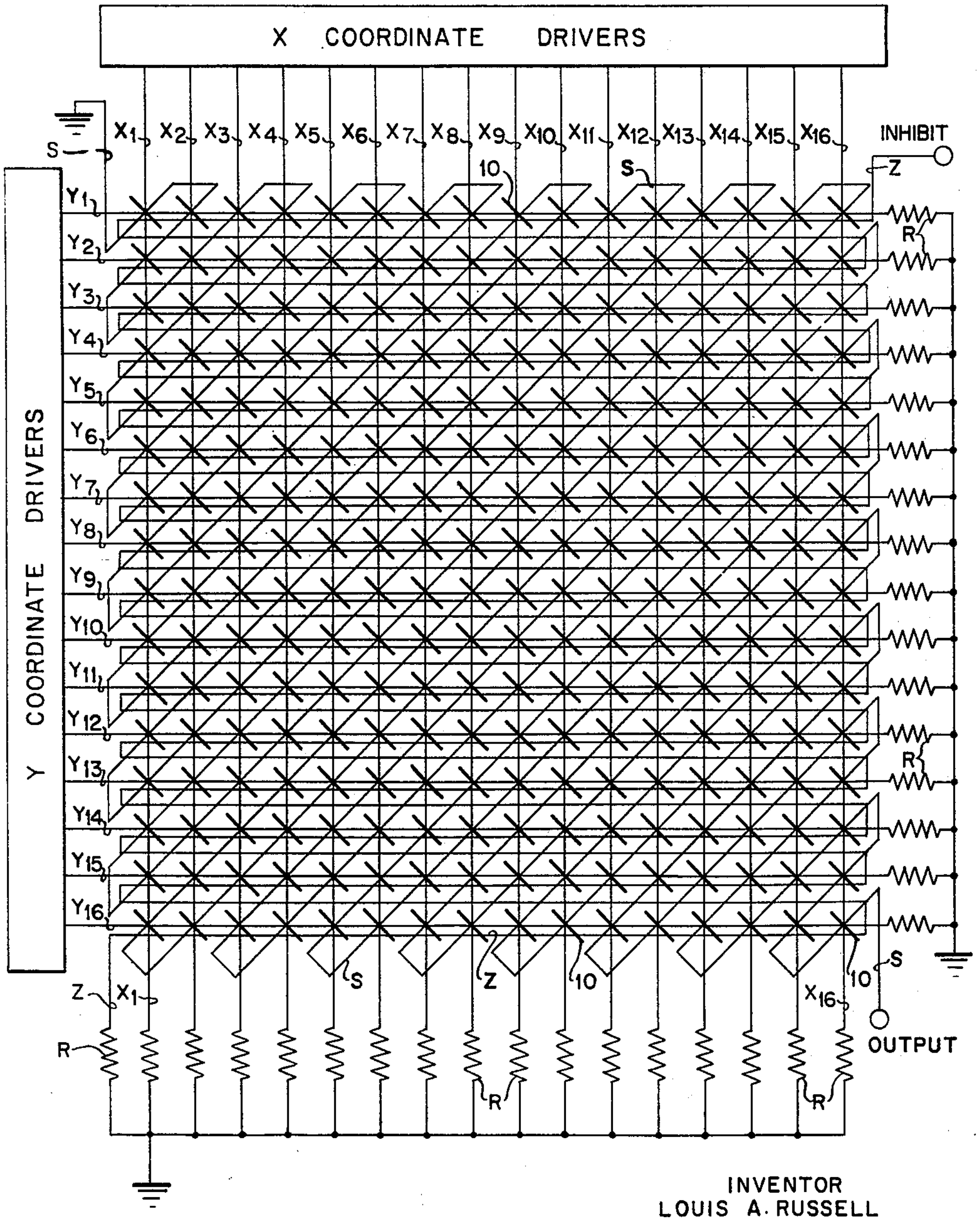
Figure 1 is a schematic representation of one plane of a magnetic core memory array operated with a two to one selection ratio.

One plane of a coincident current magnetic core memory array operated with a two to one selection ratio is shown in Figure 1 with saturable cores 10 positioned in rows and columns and linked by four windings. A coincidence of two input pulses is required to provide sufficient magnetomotive force to overcome the coercive force of any one core and for this purpose one of the column windings X and one of the row windings Y is simultaneously energized through X and Y coordinate drivers, respectively, which are coupled at one end of the selection line. The remaining terminal of each column and row selection line is coupled to ground through a resistor R. A sense winding S is shown linking each core and, in accordance with conventional practice, is wound through the array so as to cancel out the effects of those cores that are partially excited on read out pulsing. In writing a word comprising a group of like positioned cores in a plurality of planes similar to the one shown, the X and Y windings are arranged to link like cores of other planes in a similar manner and each core in the group is then energized sufficiently to change remanence state unless the Z plane or inhibit winding linking the core in that particular bit plane in which a one is not desired, is pulsed.

An array suitable for operating with a lower selection ratio is capable of reducing the number of address selection drivers required but the number of cores through which each selection line passes is far greater than it would be for a three dimensional memory as described.

Figure 2A:
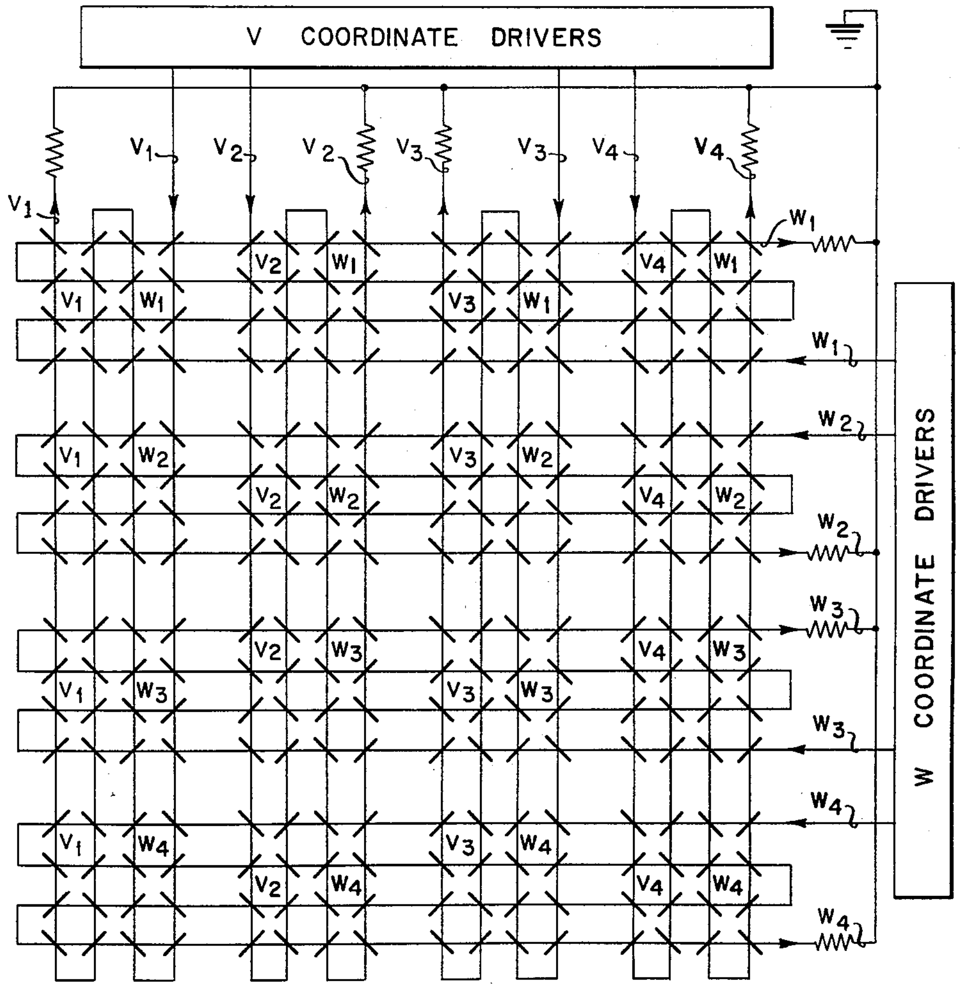
Figures 2A, 2B and 2C illustrate individual sets of windings, each of which link the cores of an array operated with a three to two selection ratio.
Figure 2B:
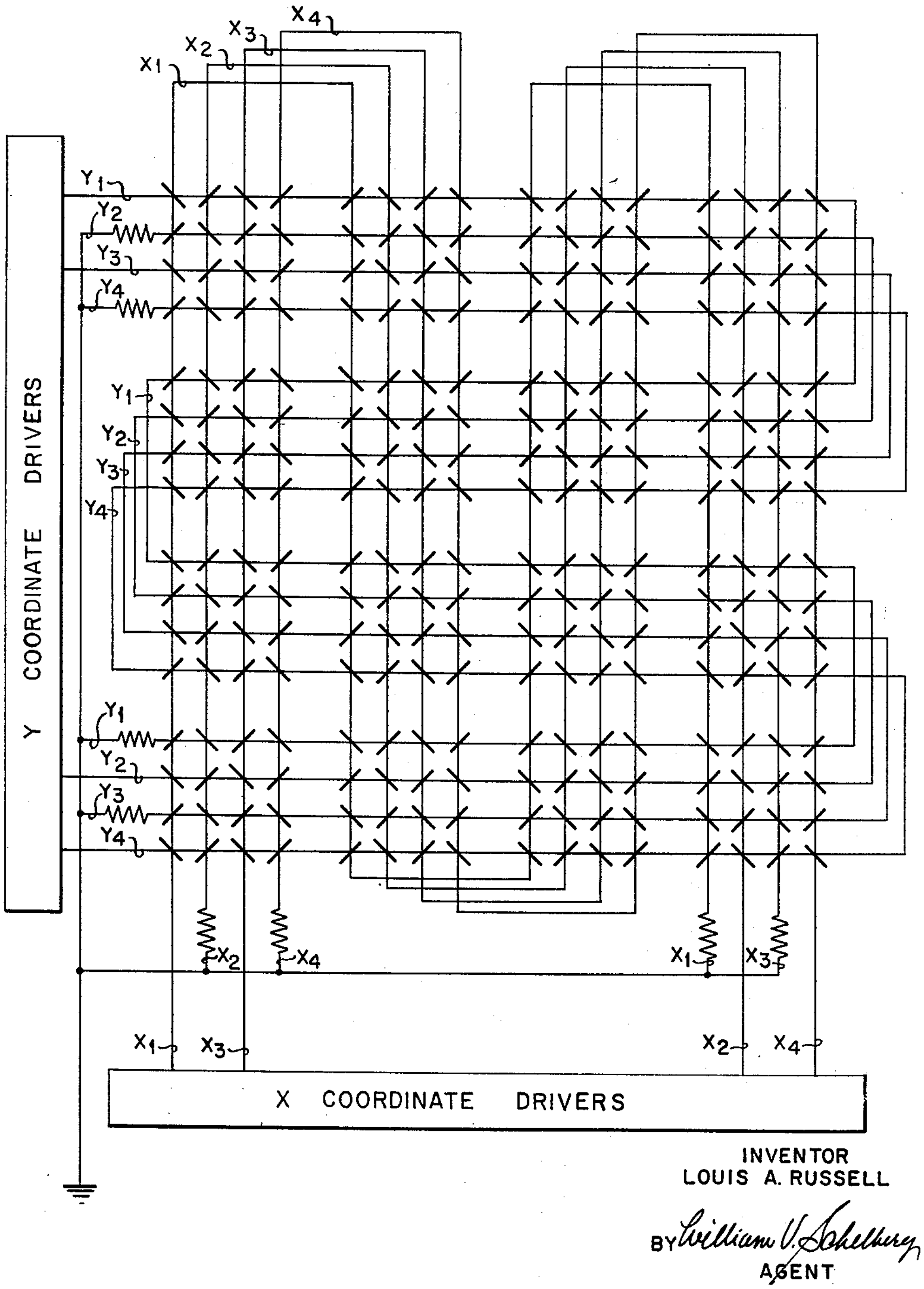
Figure 2C:
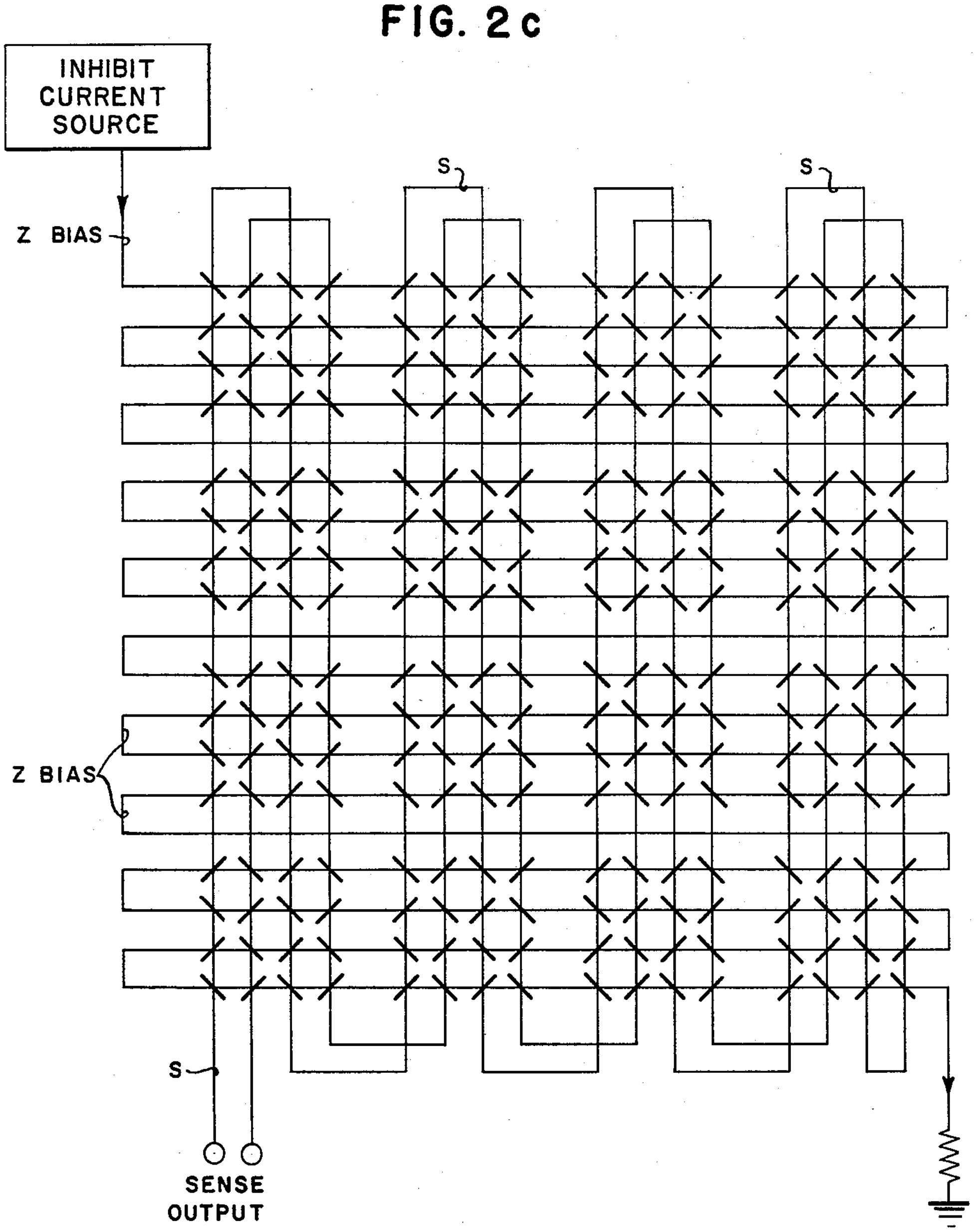

An arrangement illustrating the use of a lower selection ratio is shown in Figures 2A, 2B and 2C where the several sets of windings required by the one plane of cores are illustrated in separate figures to avoid confusion. Referring now to Figure 2A, a 16 x 16 array of cores is shown with two groups of selection lines designated V and W which subdivide the array into blocks such that all cores in a particular block are linked by a common V and W winding. X and Y selection windings for the same cores are shown in Figure 2B and are arranged so that each core within each block has the same X and Y line passing through it as cores in the same position within other blocks. Therefore, if one selection line out of each group conducts one unit of current, the addressed core will have four units of address-selection current whereas all other cores will have three, two, one or zero units. To reduce the selection ratio from four to three to three to two, a bias may be applied to each core and for this purpose an appropriately labeled Z winding is illustrated in Figure 2C. The Z bias line passes through all cores of the single plane illustrated and conducts one unit of current opposing that of the selection lines, X, Y, V and W at both read and write time so that a selected core received a net of $\pm 3$ units of current and all others receive $\pm 2$, $\pm 1$, zero or $\mp 1$ units. Since it is necessary to prevent a selected core from switching to the one state during write time when a zero is to be written in a particular plane, an inhibit line (not shown) also passes through all cores of each bit or Z plane of a cubical array so that insertion control is provided for each bit core at all word addresses in the same manner as described in connection with the array of Figure 1. This inhibition is accomplished by providing one unit of minus current, opposing that of the address-selection lines X, Y, V or W at write time when a zero is to be written. Then, when the inhibit line is pulsed the selected core receives a net of only two units of current and all other cores in the same bit plane receive one, zero, minus one or minus two units of current. This type of core memory is termed five dimensional since there are four address-selection variables plus one variable for control of information to be inserted (Z inhibit winding).

The five dimensional memory shown in Figures 2A, 2B and 2C requires fewer address-selection lines and associated drivers per address as compared with the requirements of the three dimensional array described in connection with Figure 1. A three dimensional array containing $n$ addresses requires a total $2(n)^{1/2}$ selection lines and drivers whereas with a five dimensional array the total requirement is only $4(n)^{1/4}$. For example, if $n$ is 4096, a three dimensional array requires 128 address drivers while a five dimensional array requires only 32.

Although the five dimensional system requires fewer drivers per address, the complexity of the core array is increased since four selection lines are used and these lines pass through a greater number of cores. For example, with a word length of 40 bits in a memory having 4096 word addresses, the selection lines pass through 2,560 cores for a three dimensional system and 20,480 cores for a five dimensional system. In arrays of such size, using a five dimensional selection system, and in arrays using a three dimensional system with comparable selection line length, the presence of series inductance, resistance and shunt capacitance effects along the selection lines causes them to have characteristics similar to transmission lines, as aforementioned, and the pulse delay and attenuation encountered make such lines unsatisfactory for use in a high-speed memory. Some attenuation is noticeable where the selection lines link as few as 12,000 cores and is somewhat dependent upon the pulse wave form.

Figures 3, 4, 5:
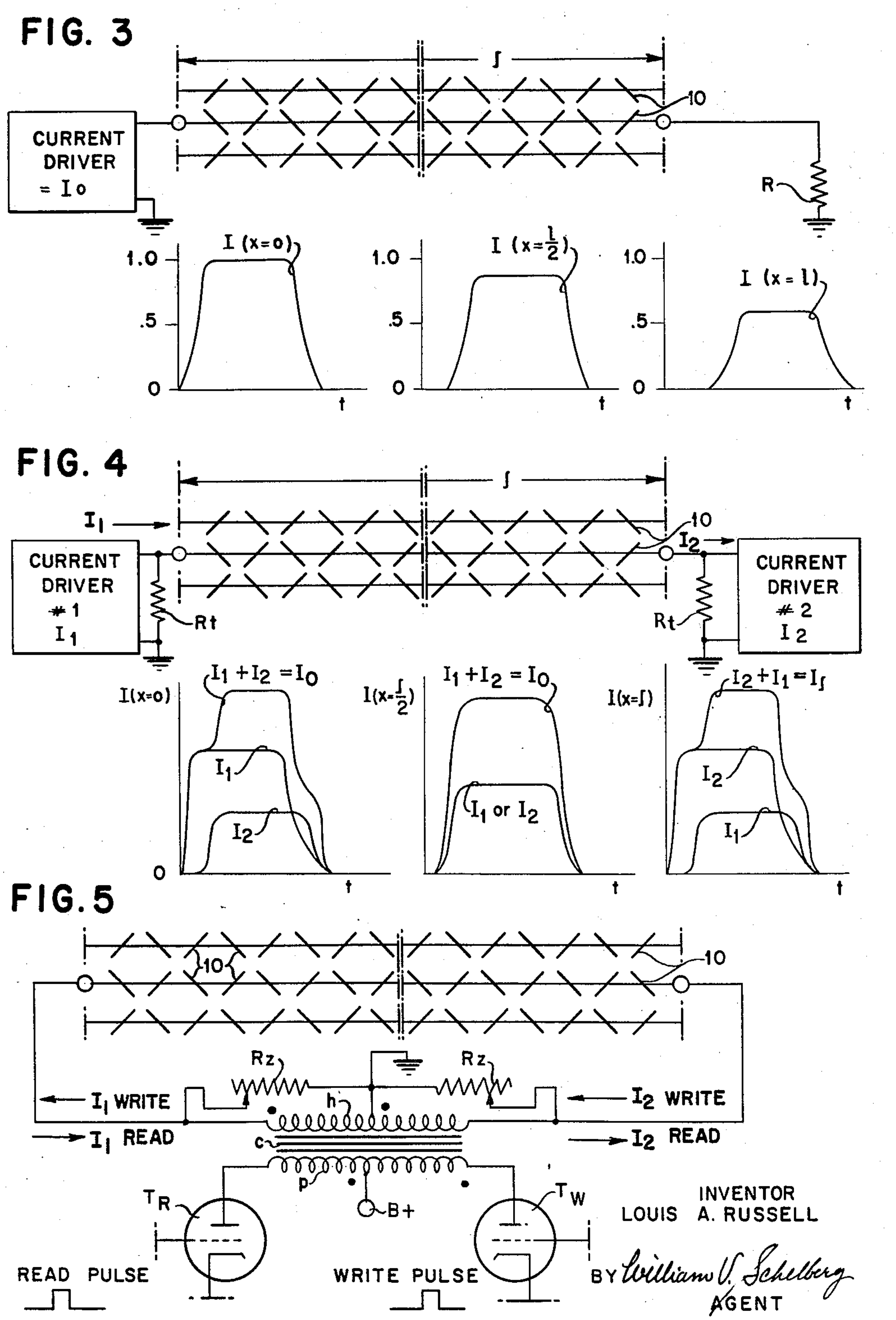
Figure 3 is a diagram illustrating attenuation and delay of drive current pulses as conventionally applied to a system arrangement such as that of Figure 1 or 2.
Figure 4 is a diagram showing the effects of a double ended drive system in reducing attenuation.
Figure 5 is an illustration of a preferred arrangement for providing double ended drive pulses to the selection lines of a core matrix in accordance with the invention.

Attenuation and pulse delay along a selection line of an array of appreciable capacity is illustrated in Figure 3, where the pulse magnitude at the beginning, middle and end of a line of length $l$ is illustrated in graphic form with the designation $x$ representative of the distance along the line from the driver source and R the terminating load resistor.

The source delivers a pulse $I_0$ to the left hand end or input terminal of the line which pulse is of unity magnitude. At the input end where the distance $x$ from the driver is zero, the pulse on the line $I_{(x=0)}$ is unity as shown below that portion. As this pulse traverses the line to its midpoint or where the distance $x$ from the driver is $$\frac{l}{2}$$

some attenuation and time delay has occurred as illustrated below this portion of the line by the pulse $$I_{(x=\frac{l}{2})}$$

At the terminal end of the line or at $x=l$ there is further attenuation and additional delay of the pulse as shown by the curve for $I_{(x=l)}$ below this portion of the line.

Referring to Figure 4, the current driver #1 at the left hand end of the line may be actuated to deliver a read or write pulse assumed, for example, as directed from left to right along the line as shown by the directional arrow $I_1$. The current driver #2 at the right hand end of the line is simultaneously actuated to cause the pulse $I_2$ to be delivered in the same directional sense as shown by the arrow $I_2$ adjacent that end of the line. The effect of these pulses at the terminals and midpoint of the line is illustrated below the line at these points. At the left hand end the attenuated and delayed $I_2$ pulse is additive to the $I_1$ pulse, while at the right hand end the attenuated and delayed $I_1$ pulse is additive to the $I_2$ pulse. At the midpoint where $$x=\frac{l}{2}$$

both pulses $I_1$ and $I_2$ are delayed and attenuated and their summation is illustrated as $I_0=I_1+I_2$. The net current at any point along the line, with the double ended drive arrangement, is the sum of the currents provided by the drivers as these current pulses appear at that point with some attenuation and delay having occurred.

In accordance with the invention, both ends of each coincidently energized address-selection line are driven simultaneously with a write or read pulse with the net current at any point $x$ along the line then being the sum of the currents from the two drivers. If the attenuation of the pulses were a linear function of distance along the line, then the sum of these two drive pulses would be a constant independent of the distance $x$ from the ends of the line, however, as attenuation varies exponentially $I_x=I_0e^{-j}$ (where $j$ is a function of the selection line characteristics and pulse shape), the total current is somewhat dependent upon the distance from the driver with the lowest current magnitude necessarily encountered at the mid point of the line.

Referring now to Figure 4, an illustration of the pulse wave form achieved with double ended drive is shown with the current from one end designated $I_1$ and that from the other end $I_2$. The pulse driver sources shown in block form many be of the type shown and described in the aforementioned application of R. G. Counihan, Serial Number 440,983, and with the ends of the line terminated in its characteristic impedance $R_t$. Briefly, this type of pulse driver includes a core of magnetic material capable of assuming one or the other stable residual state in response to pulsing of so called set and reset windings. As the driver core is set to a first remanence state, an output pulse of one polarity is produced by transformer action in a secondary winding connected to the end of the selection line and, as it is reset to its initial state, an output pulse of opposite polarity is produced. For a double ended drive system as illustrated, the set and reset windings of the individual drivers at either end of the selection line are simultaneously energized. Calculations show that if the pulse were attenuated as much as sixty percent at each receiving end, as in the conventional one driver system of Figure 3 with an array of the capacity mentioned, then the attenuation, for the type of selection line and pulse waveform being used, is no more than ten percent at the mid point of the line $$\left(X=\frac{l}{2}\right)$$

with double ended drive provided.

A circuit capable of performing double ended drive may use the same number of driving components per line as a single ended type drive, and such an arrangement is shown in Figure 5. Here a driver core C is provided with a primary winding $p$ that is center tapped and coupled to a B+ plate supply source with a read driver tube $T_R$ coupled at one end and a write driver tube $T_W$ at the other. The core C is a tape wound core of square loop magnetic material and is also provided with a secondary winding $h$ that is center tapped to ground and has its terminals coupled to the ends of the selection line. Resistors $R_z$ are connected between the ends of the secondary winding and the grounded center tap and are adjusted so that the impedance looking back into the driver from the line is equal to the characteristic impedance of the line.

Reading current pulses are controlled through application of a signal pulse to the grid of tube $T_R$ causing the latter to conduct from B+ through the left hand portion of the primary winding $p$, and write current pulses are controlled through activation of the tube $T_W$ with current flow through the right hand portion of the primary winding. It will be observed that the left hand portion of the primary winding functions to set the core C from a datum remanence state to the opposite remanence state while the right hand portion functions to reset the core back to the datum state, and each half then functions as a separate primary winding for both secondary winding halves. The tubes $T_W$ and $T_R$ may be cathode follower driven twin triode tubes of the 5998 type with the B+ potential approximately +270 volts coupled to the center tapped primary terminals through resistors of from 400 to 500 ohms.

The circuit arrangement illustrated in Figure 5 operates in the manner described in connection with Figure 4 with the left hand portion of the secondary winding $h$ functioning as the driver #1 and the right hand portion of the secondary winding $h$ functioning as the driver #2. The resistances $R_z$ correspond with the resistors $R_t$. A dot marking has been placed adjacent one end of the primary and secondary winding portions to designate the polarity or winding sense as conventionally employed. Briefly, when the core C is reset to a datum state the dot marked winding terminal is positive and when set from the datum state to the opposite state the unmarked terminal is positive.

Initially the core is in a datum remanence condition and, with a read direction pulse to be applied to the selection line of the core array, the tube $T_R$ is activated. This causes the left hand portion of the primary winding $p$ to be energized with current flow from B+ into the dot marked end of the left hand section of the primary $p$. The flux change in the core C induces a voltage in each section of the secondary winding $h$ with the unmarked terminal of each section positive and flow of current as indicated by the arrows designated $I_1$ and $I_2$ read. Thereafter when a write direction pulse is to be applied to the selection line of the memory core array, the tube $T_W$ is activated and the current flow through the primary winding $p$ is from B+ into the unmarked terminal of the right hand section of the primary winding. The core C is then reset to a datum remanence state and the voltage induced in the secondary winding sections is such that the dot marked terminal is positive with current flow as shown by the arrows marked $I_1$ write and $I_2$ write.

Obviously, separate driver transformers of the type shown in application, Serial Number 440,983 may be coupled to the selection line in the manner indicated in Figure 4, or magnetic core matrix switches, of the general type described on pages 1407–1421 of the October 1953 Issue of the Proceedings of the IRE, may be provided with center tapped secondary windings in a manner similar to that shown in Figure 5 and coupled thereto. Further, simple electronic drivers or other combinations of tubes and cores may be used with the only restriction being that both current producing means are simultaneously controlled as by the same read and write signals to accomplish the result of double ended driving. It is also contemplated that voltage sources may be used in a similar manner to minimize attenuation in selection line pulses applied to large size coincident voltage operated ferroelectric capacitor memory. While Figure 5 illustrates a preferred and more economical system for core memories, the invention is not to be considered limited to the structure specifically shown.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a magnetic memory system of the type wherein coordinate selection lines are driven in coincidence to establish a desired remanence condition in a magnetic memory core capable of assuming bistable states of magnetic remanence, means to generate driving currents for each of said selection lines, said means comprising a pair of pulse generators, one coupled to one end and the other coupled to the other end of each said selection line, and each pair of pulse generators adapted to be simultaneously operated whereupon delay and attenuation effects along the selection lines are substantially reduced.

2. Apparatus as set forth in claim 1 wherein said pulse generator comprises a switch core having winding means operable to change its magnetic condition from one to the other remanence state to provide current pulses of read and write polarity.

3. A driver arrangement for a magnetic memory matrix of the type including a plurality of magnetic cores capable of assuming bistable states of magnetic remanence with at least two sets of selecting coils on each of said cores establishing a desired remanence state in any core in said memory requiring coincident energization of one coil in each set which is coupled to said core, like coils in each set being series connected in coordinate row and column busses, and said driver arrangement comprising a pair of pulse generator means, one member of the pair coupled to each end of each of said busses and both members being adapted to be operated simultaneously in response to the application of read and write signals.

4. In a magnetic memory system of the type wherein coordinate selection lines are pulsed in coincidence to establish a desired remanence condition in a magnetic memory core capable of assuming bistable states of magnetic remanence to store and read out binary information represented thereby, a pair of pulse generator means, one member of the pair being coupled to each end of said lines and including transformer means, said transformer means comprising a core of magnetic material selectively set to one remanence state to develop a pulse of a read polarity and subsequently set to the opposite remanence state to develop a pulse of write polarity, said transformer having a grounded center tapped secondary winding with terminals connected to the ends of said lines.

5. A magnetic core current driver for providing current pulses to both ends of a selection line of a memory array, comprising, a core of magnetic material capable of assuming alternate states of magnetic remanence; set, output and reset windings for said core; said output winding being center tapped to a point of reference potential with the terminals of the output winding individually connected to one of the ends of said selection line; means including said set winding for setting said core in a first remanence state to produce a pulse of one polarity at each end of said selection line; and means including said reset winding for resetting said core to the other remanence state to develop a pulse of opposite polarity at each end of said selection line.

6. In a magnetic core memory array having a plurality of cores capable of assuming bistable states of magnetic remanence linked by at least two sets of windings individually connected in dissimilar coordinate selection lines and wherein coincident energization of at least two of said lines is necessary to establish a desired remanence state in a selected core, means for simultaneously applying energizing pulses of desired polarity to each end of each of said selection lines, said means comprising pulse transformers having cores capable of attaining opposite states of remanence with winding means thereon operable to simultaneously set and reset said cores from one to the other remanence state in developing energizing pulses of read and write polarity for said selection lines.

7. In a memory system of the type wherein coordinate selection lines are energized in coincidence to establish a selected condition representative of binary information in a memory element addressed thereby and wherein said memory element is capable of assuming bistable information conditions, means for energizing each said selection line comprising a pair of pulse generator means, one member of the pair being coupled to each end thereof and adapted to be simultaneously operated in a selected sense to provide read and write polarity energization of said lines with a minimum of attenuation and delay therealong.

8. In a memory array having a plurality of elements capable of assuming bistable information states and individually connected to dissimilar groups of coordinate selection lines and wherein coincident energization of at least two of said lines is necessary to establish a desired information representing state in a selected element, means for simultaneously applying energizing pulses of desired polarity to each end of each of said selection lines comprising pulse generator means coupled thereto and adapted to be operated simultaneously in the same sense to provide read and write energization of the selected element.

9. A magnetic core current driver for providing current pulses of desired polarity simultaneously to each end of a selection line of a memory array, comprising a core of magnetic material capable of assuming bistable states of magnetic remanence; set, output and reset windings for said core, said output winding being center tapped to a point of reference potential with the terminals of the output winding individually connected to a different one of the ends of said selection line; means for energizing said set winding to induce a pulse of one polarity at the terminals of said secondary winding, and means for energizing said reset winding to induce a pulse of opposite polarity at the terminals of said output winding.

References Cited in the file of this patent

UNITED STATES PATENTS

| | | |
|---|---|---|
| 1,607,473 | Milnor | Nov. 16, 1926 |
| 2,088,699 | Hailes | Aug. 3, 1937 |
| 2,360,940 | Edwards | Oct. 24, 1944 |
| 2,691,154 | Rajchman | Oct. 5, 1954 |
| 2,802,203 | Stuart-Williams | Aug. 6, 1957 |
| 2,856,596 | Miller | Oct. 14, 1958 |